(12) United States Patent
Bichler et al.

(10) Patent No.: US 7,855,260 B2
(45) Date of Patent: *Dec. 21, 2010

(54) POLYETHER-CONTAINING COPOLYMER

(75) Inventors: Manfred Bichler, Engelsberg (DE); Herbert Hommer, Mühldorf (DE); Konrad Wutz, Trostberg (DE)

(73) Assignee: BASF Construction Polymers GmbH, Trostberg (DE)

( * ) Notice: Subject to any disclaimer, the term of this patent is extended or adjusted under 35 U.S.C. 154(b) by 551 days.

This patent is subject to a terminal disclaimer.

(21) Appl. No.: 11/827,722

(22) Filed: Jul. 13, 2007

(65) Prior Publication Data

US 2007/0255032 A1 Nov. 1, 2007

Related U.S. Application Data

(63) Continuation of application No. 11/451,625, filed on Jun. 12, 2006, now abandoned, which is a continuation-in-part of application No. 11/152,678, filed on Jun. 14, 2005, now abandoned.

(51) Int. Cl.
*C08F 28/02* (2006.01)
*C08F 22/10* (2006.01)

(52) U.S. Cl. .................. 526/287; 526/318.5; 526/317.1

(58) Field of Classification Search ................ 526/287, 526/318.5, 317.1
See application file for complete search history.

(56) References Cited

U.S. PATENT DOCUMENTS 6,777,517 B1 * 8/2004 Albrecht et al. .......... 526/317.1

FOREIGN PATENT DOCUMENTS

| DE | 195 43 304 A1 | 5/1997 |
| EP | 0 537 870 A1 | 4/1993 |
| EP | 0 736 553 B1 | 10/1996 |
| EP | 1 189 955 B1 | 3/2002 |

* cited by examiner

*Primary Examiner*—Michael M Bernshteyn
(74) *Attorney, Agent, or Firm*—Fulbright & Jaworski L.L.

(57) ABSTRACT

Copolymers include two monomer components, a) an olefinic unsaturated monocarboxylic acid comonomer or an ester or a salt thereof of an olefinic unsaturated sulfuric acid comonomer or a salt thereof, and b) an ether comonomer of the general formula (I)

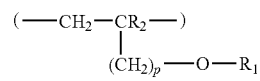

Components a) and b) are present in amounts of from 30 to 90 mol-% and from 70 to 10 mol-%, respectively, and comonomer component a) is selected from the group consisting of acrylic acid, methacrylic acid, crotonic acid, isocrotonic acid, allylsulfonic acid, vinylsulfonic acid and a salt thereof or an alkyl or hydroxyalkyl ester. Compositions including a hydraulic binder such as cement, gypsum, lime and anhydrite and the copolymer are also disclosed. The copolymer can be used as superplasticizer or dispersant for non-hardened (wet) and a hydraulic binder containing compositions.

27 Claims, No Drawings

POLYETHER-CONTAINING COPOLYMER

This application is a continuation of Ser. No. 11/451,625 filed Jun. 12, 2006, now abandoned which is a continuation-in-part of Ser. No. 11/152,678 filed Jun. 14, 2005, now abandoned, each of which is incorporated herein by reference in their entirety.

FIELD OF THE INVENTION

This invention relates to a copolymer on a polyether basis comprising two monomer components and a method of use.

BACKGROUND OF THE INVENTION

Various types of organic compounds have been used to advantageously alter certain properties of wet hydraulic cement compositions. One class of components, which can collectively be called "superplasticizers" fluidify or plasticize the wet cement composition to obtain a more fluid composition. A controlled fluidity is desired, such that the aggregate used in mortars and concretes does not segregate from the cement paste. Alternatively, superplasticizers may allow the cement composition to be prepared using a lower water to cement ratio in order to obtain a composition having a desired consistency which often leads to a hardened cement composition having a higher compressive strength development after setting.

A good superplasticizer should not only fluidify the wet cement composition to which it is added, but also maintain the level of fluidity over a desired period of time. This time should be long enough to keep the wet cement composition fluid, e.g. in a ready-mix truck while it is on its way to a job site. Another important aspect relates to the period for discharging the truck at the job site and the period needed for the cement composition for being worked in the desired final form. On the other side, the cement mixture cannot remain fluid for a too long time, that means the set must not greatly be retarded, because this will slow down the work on the job and show negative influences on the characteristics of the final hardened products.

Conventional examples of superplasticizers are melamine sulfonate/formaldehyde condensation products, naphthalene sulfonate/formaldehyde condensation products and lignosulfonates, polysaccharides, hydroxycarboxylic acids and their salts and carbohydrates.

In most cases, fluidizing agents are multi-component products with copolymers based on oxyalkylenglykolalkenylether and unsaturated dicarboxylic acid-derivatives as most important species. The European Patent EP 0 736 553 B1 discloses such copolymers comprising at least three sub-units and especially one unsaturated dicarboxylic acid derivative, one oxyalkylenglykolalkenylether and additionally one hydrophobic structural unit, such as ester units. The third structural unit can also be represented by polypropylenoxid- and polypropylenoxid-polyethylenoxid-derivatives, respectively.

The German published application DE 195 43 304 A1 discloses an additive for water containing mixtures for the construction field comprising a) a water-soluble sulfonic acid-, carboxylic- or sulfate group containing cellulose derivative, b) a sulfonic acid- and/or carboxylic acid containing vinyl-(co)-polymer and/or a condensation product based on aminoplast-builders or acryl containing compounds and formaldehyde. This additive shall show sufficient water retention ability and rheology-modifying properties. Therefore, this additive shall be suitable for construction chemical compositions containing cement, lime, gypsum, anhydrite and other hydraulic binder components.

Disclosed are also copolymers of ethylenically unsaturated ethers that can be used as plasticizers for cement containing mixtures (EP 0 537 870 A1). These copolymers contain an ether co-monomer and as additional co-monomer an olefinic unsaturated mono-carboxylic acid or an ester or a salt thereof, or alternatively an olefinic unsaturated sulfuric acid. These copolymers show a very short ether side chain with 1 to 50 units. The short side chain shall cause a sufficient plasticizing effect of the copolymers in cement containing masses with a reduced slump loss of the construction chemicals mass itself.

Based on the different characteristics and the availability of the superplasticizers mentioned above, it has been further desired to come up with new superplasticizers which are an improvement over the current state of the art. It is thus an object of this invention to provide new additives for hydraulic binder containing compositions which impart to wet binder compositions excellent slump and slump retention over the time. An additional aspect is an aqueous binder suspension with sufficient workability. Furthermore, the properties, the performance and effects of the provided copolymer shall be arbitrary.

DETAILED DESCRIPTION OF THE INVENTION

The present invention relates to a copolymer consisting of two monomer components with a first component
an olefinic unsaturated mono-carboxylic acid co-monomer or an ester or salt thereof or an olefinic unsaturated sulfuric acid co-monomer or a salt thereof,
and as second component
a co-monomer according to the general formula (I)

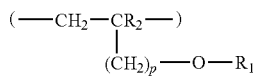

and $R_1$ is represented by

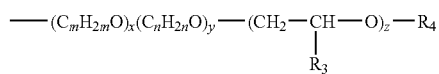

and whereby $R_2$=H or an aliphatic hydrocarbon group having from 1 to 5 carbon atoms, $R_3$ is a non-substituted or substituted aryl group and preferably phenyl, and $R_4$=H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

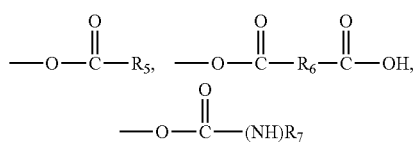

wherein $R_5$ and $R_7$ may each be an alkyl, aryl, aralkyl or alkaryl group and $R_6$ may be an alkyliden, aryliden, aralkyliden or alkaryliden group and p=0 to 3, m, n=2 to 4, x and y are independently and integer from 55 to 350, and z=0 to 200.

Surprisingly, these polymers according to the invention based on their dispersing properties show excellent plasticizing effects over time and additionally can be prepared by using usual preparation methods. Therefore, under economic aspects, these co-polymers show significant improvements over the prior art. Another aspect may be that the claimed copolymers show their plasticizing effect not only together with specific hydraulic components, but in the field of cementitious mortar and concrete and in the field of gypsum. Additionally, the improved effect of the copolymers can be selectively chosen based on the broad variety of the ether co-monomer and especially based on the broad scope of the side chain length.

As used herein, the term "cement composition" refers to any wet and not hardened mixture, such as pasty mortars, grouts such as oil well cementing grouts, and concrete compositions comprising a hydraulic cement binder. In this connection, an important role is to be played by the various types of hydraulic binders, such as cements (especially Portland cement), but also including fly ashes, blast furnace slags, micro silicas, puzzolanic components and the various types of gypsum.

The term "gypsum" according to this invention is also known as calcium sulfate, whereby calcium sulfate can be used in its various anhydrous and hydrate forms with or without crystal water. Natural gypsum is represented by calcium sulfate dihydrate and the natural crystal water free form of calcium sulfate is represented by the term "anhydrite". Besides the natural forms, calcium sulfate is a typical by-product of technical processes characterized by the term "synthetic gypsum". One example of such technical processes is the flue gas desulfurization. Synthetic gypsum may also be a by-product of phosphorous acid and hydrogen fluoride production methods for gaining semi-hydrate forms ($CaSO_4 \cdot \frac{1}{2}H_2O$). Gypsum ($CaSO_4 \cdot 2H_2O$) is to be calcinated by driving off of the water of hydration. Products of the various calcinating procedures are alpha or beta hemi-hydrate. Beta calcium sulfate hemi-hydrate results from a rapid heating in open units by a rapid evaporation of water and by forming cavities. Alpha hemi-hydrate is produced by a de-watering of gypsum in closed autoclaves. The crystal form in this case is dense and therefore, this binder needs less amounts of water than beta hemi-hydrate.

On the other side, gypsum hemi-hydrate re-hydrates with water to dihydrate crystals. Usually, the hydration of gypsum needs some minutes to hours indicating a clearly shortened workability period in contrast to cements that hydrate in periods over hours or days. These characteristics make gypsum an attractive alternative to cement as hydraulic binder in various fields of application, because hardened final gypsum products show a characteristic hardness and compressive strength.

Calcium sulfate hemi-hydrate can produce at least two crystal forms, whereby α-calcined gypsum is usually de-watered (de-hydrated) in closed autoclaves. For various fields of application, β-calcined gypsum may be selected due to its availability under economical aspects. However, these advantages may be reversed because β-calcined gypsum needs higher water amounts for workability and for making slurries of a given fluidity. Hardened or dried gypsum tends to a certain weakening based on the remained water in its crystal matrix. Therefore, products thereof show less strength than gypsum products that have been made with smaller amounts of water.

In general, the workability of gypsum, but also of other hydraulic binders, can be improved under hydraulic aspects by adding dispersants. In this connection, the copolymers according to this invention represent suitable dispersants because of their dispersing properties.

The copolymer of this invention shows more advantageous properties when it comprises the co-monomer component a) in amounts of from 30 to 99 mol-% and the ether component b) from 70:1 mol-%.

As used herein, the mentioned co-monomers and any possible structures thereof are to be interpreted as structural units of the claimed copolymer after its polymerisation.

The invention comprises an alternative characterized in that a) the mol-% of the co-monomer component a) and the co-monomer b) is from 40 to 90 and from 60 to 10, respectively, and whereby b) the ether component b) with p=0 or 1 is represented by an allyl or vinyl group and additionally contains a polyether as $R_1$; additionally, the co-monomer component a) is in this alternative an acrylic acid or a salt thereof.

In general, according to this invention, the co-monomer component a) is selected from the group consisting of acrylic acid, methacrylic acid, crotonic acid, isocrotonic acid, allyl sulfonic acid, vinyl sulfonic acid and their suitable salts or their alkyl or hydroxyalkyl esters.

Alternatively, other co-monomers, such as styrene or acrylamides may be additionally co-polymerized with the ether component b) and the co-monomer component a). Alternatively, there also may be used components with hydrophobic properties. Compounds with ester structural units, polypropylene oxide or polypropylene oxide-polyethylene oxide (PO/PE)-units are preferred. These structural units should be represented in the copolymer in amounts up to 5 mol-%; amounts from 0.05 to 3 mol-% and 0.1 to 1.0 mol-% are preferred. Compounds as disclosed by the European Patents EP 0 736 553 B1 and EP 1 189 955 B1 as structural units c) and any related and in these both documents disclosed species of compounds are more preferred. Regarding the structure of the additional co-monomer EP 0 736 553 B1 and EP 1 189 955 B1 are incorporated into this application and therefore are to be seen as disclosed herein.

An additional preferred alternative of the copolymers according to this invention is to be seen in formula (I) representing an allyl or vinyl group containing polyether.

As already mentioned, the copolymers of this invention can be produced by relatively simple methods and especially when the polymerisation is carried out in an oxygen-depleted or oxygen-free atmosphere. There also may be added some amounts of solvents to make the ether component soluble. In the case that co-monomer b) is a poly-alcoholic group or an alkylen oxide derivatived poly-alcohol group, and $R_2$ of the ether component is hydrogen, respectively, water is the solvent to be preferred. Alternatively, a mixture of water and alcohol, such as isopropanol, may be added. In the case that $R_2$ is other than hydrogen, then organic solvents and especially toluene is to be seen as preferred.

For starting the polymerisation reaction, the basic mixture is heated to ambient temperature or smoothly cooled down. Another suitable alternative may be the addition of a redox system as initiator component. This redox system may comprise reducing and oxydizing agents and preferably Rongalite™ or Bruggolite™ and additionally a peroxide or a persulfate like $H_2O_2$ or ammonia persulfate. These reagents may be preferably used in systems with water as solvent.

In principal, two alternatives may be selected to produce the copolymers according to this invention:

Alternative A:

The co-monomer mixture and the reducing agent containing mixture are to be added to the ether containing mixture stepwise or simultaneously; the temperatures range from 0 to 50° C.

Alternative B:

The mixture containing the oxidizing agent is to be added stepwise to the complete monomer mixture.

Then the reaction mixture is usually stirred until all the peroxide has reacted. In the case that organic solvents are to be used, these will be distilled. The reaction product will then be cooled down and the copolymer is to be neutralized by using a base (such as alkaline or alkaline earth metals, amines or alkanol amines). The addition of an aqueous solution comprising sodium or calcium hydroxide is a preferred alternative.

This disclosed process represents an example for producing the copolymer according to this invention.

Finally, this invention covers a preferred alternative with the copolymers in powdery form. The powder is to be achieved by a final drying step and more preferably, by spray drying.

In contrast to the state of the art this method produces beneficial powdery copolymers to be added to hydraulic mixtures in any selected dilution.

Besides the copolymer itself this invention also covers a hydraulic binder containing composition that comprises additionally to the hydraulic component the copolymer of this invention. In this connection a composition is preferred whose hydraulic binder is selected from the group consisting of cement, gypsum, lime, anhydrite or any other calcium sulfate based binder.

Also claimed by this invention is a method of use of the copolymer according to this invention as superplasticizer (dispersant) for any non-hardened (wet) and a hydraulic binder containing composition. In this connection the copolymer is preferably used in amounts from 0.01 to 10.0% by weight und more preferably in amounts from 0.05 to 5.0% by weight, each amount relating to the weight of the binder component.

Another aspect of the claimed method of use is directed to the alternative to use the copolymer according to the invention in combination with a defoaming component. This alternative may be realized by an addition of the copolymer and the defoaming agent to the construction material composition in separated form depending from the specific application. This invention additionally claims the alternative that the claimed copolymer comprises the defoaming component as third structural group in copolymerized form.

In the case that the defoaming component is added to the composition in separated form then representatives of the following group are to be seen as preferred: non-ionic tensides like copolymers comprising ethylene oxide/propylene oxide-(EO—PO)-units (Dowfax™ of the Dow company) or EO—PO-EO or PO-EO—PO block copolymers, respectively (Pluronic™ of BASF). Additionally defoamer on a mineral oil basis can also be used; such defoamers can be used in powder form such as Agitan types of the Münzing Chemie company.

In the case that the defoaming agent represents an additional chemical structural group of the copolymer the already mentioned structural units c) of the European patents EP 0 736 553 B1 and EP 1 189 955 B1 may be used.

The claimed copolymer and especially its application as superplasticizer or dispersant in hydraulic binder containing composition represents a clear improvement of the state of the art because the claimed copolymer induces a uniform plasticizing effect over time and a reduced tendency of the negative slump loss in the wet construction chemicals mass. In sum, the claimed copolymer shows a typical retention effect. Additionally, the pumpability and workability of the wet hydraulic binder containing composition is significantly improved.

The following examples underline the advantages of the claimed copolymer and its use.

EXAMPLES

Preparation Example 1

To a 1 liter four necked glass flask with a temperature controller, a reflux condenser and two dropping funnels 350 g water, 350 g (0.06 mol) of polyethylene glycol-5800-monovinylether and 4 g of a propylene oxide/ethylene oxide (PO-EO)-block polymer with a molecular mass of 2,000 g/mol ("defoamer") and 25 g NaOH (20%) have been added. A mixture comprising 45 g (0.63 mol) of acrylic acid in 17 g water has been produced separately and 15 g of this mixture has been added to the polyethylene glycol-5800-monovinylether solution in the flask; the pH decreased to 8.0. Then 40 mg iron(II)sulfate-heptahydrate ("green vitriol") and 3.6 g of a 50% hydrogen peroxide have been added. Within 20 minutes the remaining acrylic acid mixture and 34 g of a 10% Rongalite™ solution containing 6 g of mercaptoethanol have been added under a constant but differing mass flow. The temperature rose from 23 to 35° C. After the final addition the reaction mixture showed a pH of 4.8. The solution has been stirred at ambient temperature for 10 minutes and subsequently has been neutralized with 50 g of a 20% sodium hydroxide solution. The product was a yellow colored, clear and aqueous polymer solution with a solid concentration of 45% by weight.

Preparation Example 2

To the flask according to Example 1 450 g water, 450 g (0.06 mol) polyethylene glycol-7500-monovinylether and 14 g NaOH (20%) have been added. A mixture of 41.8 g (0.58 mol) of acrylic acid in 40 g water has been produced separately and added to the flask containing polyethylene glycol-7500-monovinylether solution; the pH decreased to 5.5. Then 40 mg iron(II)sulfate-heptahydrate ("green vitriol") and 4 g Rongalite™ and 2 g mercaptoethanol have been added. Within 20 minutes a solution comprising 3.6 g 50% hydrogen peroxide in 34 g water have also been added. The temperature rose from 20 to 31° C. After the final addition, the reaction mixture showed a pH of 5.4. The solution has been stirred for 10 minutes at ambient temperature and subsequently has been neutralized with 60 g of a 20% sodium hydroxide solution. The product was a light yellow colored, clear and aqueous polymer solution with a solid concentration of 43% by weight.

Preparation Example 3

To the flask according to Example 1 490 g water, 350 g (0.06 mol) polyethylene glycol-5800-monovinylether and 10 g NaOH (20%) have been added. A mixture comprising 26 g (0.36 mol) of acrylic acid in 40 g water has been produced separately and added to the polyethylene glycol-monovinylether-solution; the pH decreased to 5.3. Then 40 mg iron (II)sulfate-heptahydrate ("green vitriol") and 4 g Rongalite™ and 1.5 g mercaptoethanol have been added. After a short period of stirring 3.6 g 50% hydrogen peroxide have been added. The temperature rose from 20 to 29° C. Then the solution has been stirred for 10 minutes at ambient temperature and subsequently has been neutralized with 37 g of a 20% sodium hydroxide solution. The product was a light yellow colored, clear and aqueous polymer solution with a solid concentration of 40% by weight.

Application Examples

The comparative Examples 1 and 2 given in the following application testings are related to the corresponding examples 1 (comparison 1), respectively, 3 (comparison 2) as described in EP 0 537 870 A1

Application Testing 1: Concrete

In a standardized manner a concrete recipe corresponding to 400 kg/m³ OPC CEM I 42.5 R and 1755 kg/m³ of fine and coarse aggregate (grading 0 to 16 mm), 40 kg/m³ fly ash and 168 kg/m³ water (water from the polymer solution taken into account, w/c ratio 0.42) were mixed. The aqueous solutions according to the present invention, respectively, to the comparative examples were added as superplasticizers and the spread value was determined 4, 30 and 60 min after the polymer addition in accordance to DIN 1048.

| Superplasticizer | Dosage [% bwc] | Spread in cm after | | |
|---|---|---|---|---|
| | | 4 min | 30 min | 60 min |
| Comparison 1* | 0.22 | 51 | 49 | 42 |
| Example 1 | 0.22 | 65 | 59 | 50 |
| Example 2* | 0.22 | 64 | 61 | 58 |
| Example 3* | 0.22 | 65 | 63 | 60 |

*defoamer addition (based on polygylcols), dosage 1.0% by weight by weight of active polymer Application Testing 2: Mortar Guide Recipe:

| | |
|---|---|
| Portland Cement (different types) | 900 g |
| Quartz sand (0-2 mm, EN 196-1) | 1350 g |
| Defoamer (Agitan P 800) | 0.45 g |
| Dispersant (Plasticizer) | 0.3%-bwc |
| Mixing water | accordingly |

Mixing Procedure and Measurement:

The mortar was mixed according to DIN EN 196-1, paragraph 6.3. The flowability was tested with a flow channel according to the machinery grout guide lines published by the Deutsche Betonverein eV (issued September 1990) after 5, 30 and 60 min. For each type of cement the initial flowability was adjusted with the superplasticizer of Comparison 1 to be in a range of 60-75 cm by varying the w/c ratio accordingly

| 1. OPC Milke (CEM I 42.5 R) | | | | |
|---|---|---|---|---|
| | | Flowability in cm after | | |
| Superplasticizer | W/C | 4 min | 30 min | 60 min |
| Comparison 1 | 0.24 | 72 | 58 | 0 |
| Comparison 2 | 0.24 | 70 | 49 | 0 |
| Example 3 | 0.24 | 73 | 69 | 39 |

| 2. OPC Karlstadt (CEM I 42.5 R) | | | | |
|---|---|---|---|---|
| | | Flowability in cm after | | |
| Superplasticizer | W/C | 4 min | 30 min | 60 min |
| Comparison 1 | 0.31 | 60 | 68 | 68 |
| Comparison 2 | 0.31 | 52 | 50 | 55 |
| Example 3 | 0.31 | 85 | 85 | 85 |

| 3. OPC Mergelstetten (CEM I 42.5 R) | | | | |
|---|---|---|---|---|
| | | Flowability in cm after | | |
| Superplasticizer | W/C | 4 min | 30 min | 60 min |
| Comparison 1 | 0.26 | 64 | 0 | 0 |
| Comparison 2 | 0.26 | 62 | 0 | 0 |
| Example 3 | 0.26 | 78 | 59 | 26 |

| 4. OPC Ube Kosan normal OPC-Cement | | | | |
|---|---|---|---|---|
| | | Flowability in cm after | | |
| Superplasticizer | W/C | 4 min | 30 min | 60 min |
| Comparison 1 | 0.245 | 74 | 14 | 0 |
| Comparison 2 | 0.245 | 74 | 12 | 0 |
| Example 3 | 0.245 | 77 | 72 | 42 |

Application Testing 3: Gypsum

| Guide recipe | |
|---|---|
| Stucco | 400 g |
| Water (W/G = 0.35) | 140 g |
| Superplasticizer | 0.35%-bwg 1.4 g (active material) |

Mixing Procedure and Measurement:

The stucco is sifted into water within 15 sec and afterwards mixed with a Hobart mixer for 60 sec at high speed (285 rpm). After 105 sec the flow value was measured with a cylinder (height: 10 cm, diameter: 5 cm). The set time is determined by means of the so-called knife cut test.

| Superplasticizer | Flow in cm | Set times in min:sec |
|---|---|---|
| Comparison 1 | 12 | 27:20 |
| Comparison 2 | 13 | 30:00 |
| Example 2 | 20 | 5:10 |
| Example 3 | 23 | 4:40 |

The invention claimed is:
1. A copolymer comprising two monomer components, wherein component
 a) is an olefinic unsaturated monocarboxylic acid comonomer or an ester or a salt thereof or an olefinic unsaturated sulfuric acid comonomer or a salt thereof, and component b) is a comonomer of formula (I)

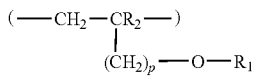

wherein $R_1$ is

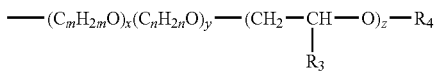

and wherein $R_2$ is H or an aliphatic hydrocarbon group having from 1 to 5 carbon atoms, $R_3$ is a non-substituted or substituted aryl group, and $R_4$ is H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

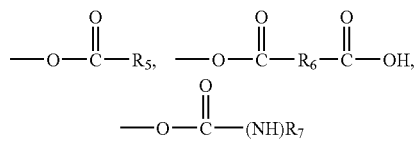

wherein $R_5$ and $R_7$ may each be an alkyl, aryl, aralkyl or alkaryl group and $R_6$ may be an alkyliden, aryliden, aralkyliden or alkaryliden group and p=0 to 3; m and n are from 2 to 4, x and y are independently and integer from 55 to 350, and z is from 1 to 200.

2. The copolymer of claim 1, comprising from 30 to 99 mol-% of comonomer component a) and from 70 to 1 mol-% of said ether component b).

3. The copolymer of claim 1, wherein the amount of said comonomer component a) is from 40 to 90 mol-% and the amount of said comonomer component b) is from 60 to 10 mol-%.

4. The copolymer of claim 1 wherein said comonomer component a) is an acrylic acid or a salt thereof and the said ether component b) with p=0 or 1 represents an allyl or vinyl group and additionally contains a polyether.

5. The copolymer of claim 1, wherein said comonomer component
a) is selected from the group consisting of acrylic acid, methacrylic acid, croton acid, isocrotonic acid, allylsulfonic acid, vinylsulfonic acid and salts thereof and alkyl or hydroxyalkyl esters thereof.

6. The copolymer of claim 1 wherein the copolymer comprises an additional structural group in copolymerized form.

7. The copolymer of claim 6, wherein said additional structural group is selected from the group consisting of a styrene, an acrylamide, a hydrophobic compound, and an ester, polypropylene oxide, and polypropylene oxide/polyethylene oxide.

8. The copolymer of claim 6, wherein the additional structural group is present in an amount of up to 5 mol-%.

9. The copolymer of claim 1, wherein formula (I) is an allyl or vinyl group containing polyether.

10. The copolymer of claim 1, wherein the copolymer is a powder.

11. A hydraulic binder containing composition comprising a hydraulic component and the copolymer of claim 1.

12. The composition of claim 11 wherein the hydraulic binder is selected from the group consisting of cement, gypsum, lime, and anhydrite.

13. A method comprising adding the copolymer of claim 1 as a superplasticizer to a non-hardened (wet) and a hydraulic binder containing composition.

14. The method of claim 13, wherein the copolymer is added as superplasticizer in amounts from 0.01 to 10.0% by weight, wherein the amounts are relating to the weight of the binder component.

15. The method of claim 13, wherein the copolymer is used in combination with a defoaming component.

16. The method of claim 15 wherein the copolymer comprises the defoaming agent as additional structural unit.

17. The composition of claim 12, wherein the hydraulic binder comprises calcium sulfate.

18. The method of claim 1, wherein $R^3$ is phenyl.

19. The method of claim 14, wherein the copolymer is added as superplasticizer in amounts of from 0.05 to 5.0% by weight.

20. A copolymer consisting essentially of two monomer components, wherein component
a) is an olefinic unsaturated monocarboxylic acid comonomer or an ester or a salt thereof or an olefinic unsaturated sulfuric acid comonomer or a salt thereof, and component b) is a comonomer of formula (I)

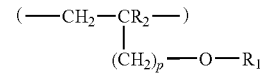

wherein $R_1$ is

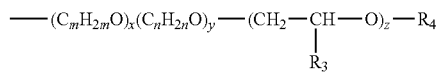

and wherein $R_2$ is H or an aliphatic hydrocarbon group having from 1 to 5 carbon atoms, $R_3$ is a non-substituted or substituted aryl group, and $R_4$ is H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

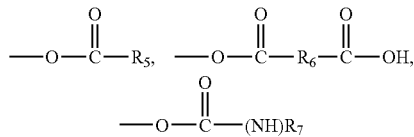

wherein $R_5$ and $R_7$ may each be an alkyl, aryl, aralkyl or alkaryl group and $R_6$ may be an alkyliden, aryliden, aralkyliden or alkaryliden group and p 0 to 3, m, n=2 to 4, x and y are independently and integer from 55 to 350, and z is from 1 to 200.

21. A copolymer consisting of two monomer components, wherein component
a) is an olefinic unsaturated monocarboxylic acid comonomer or an ester or a salt thereof or an olefinic unsaturated sulfuric acid comonomer or a salt thereof, and component b) is a comonomer of formula (I)

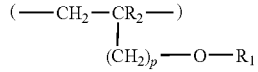

wherein $R_1$ is

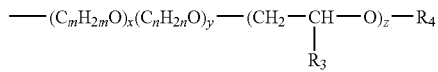

and wherein $R_2$ is H or an aliphatic hydrocarbon group having from 1 to 5 carbon atoms, $R_3$ is a non-substituted or substituted aryl group, and $R_4$ is H or an aliphatic hydrocarbon group having from 1 to 20 carbon atoms, a cycloaliphatic hydrocarbon group having from 5 to 8 carbon atoms, a substituted aryl group having from 6 to 14 carbon atoms or a compound selected from the group

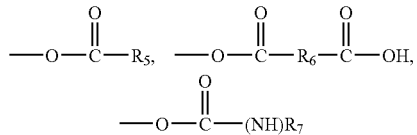

wherein $R_5$ and $R_7$ may each be an alkyl, aryl, aralkyl or alkaryl group and $R_6$ may be an alkyliden, aryliden, aralkyliden or alkaryliden group and p=0 to 3, m, n=2 to 4, x and y are independently and integer from 55 to 350, and z is from 1 to 200.

22. The method of claim 19, wherein $R^3$ is phenyl.
23. The method of claim 20, wherein $R^3$ is phenyl.
24. The method of claim 1, wherein x and y are 55.
25. The method of claim 1, wherein x and y are 350.
26. The method of claim 1, wherein n is 3.
27. The method of claim 26, wherein m is 2.

* * * * *